July 19, 1960

A. BLOOM 2,945,501

AUXILIARY TANK RELIEF VALVE

Filed Dec. 22, 1958

AARON BLOOM
INVENTOR.

BY Bechler & Shanahan

ATTORNEYS.

United States Patent Office 2,945,501
Patented July 19, 1960

2,945,501
AUXILIARY TANK RELIEF VALVE

Aaron Bloom, Pasadena, Calif., assignor to Sierra Engineering Co., Sierra Madre, Calif., a corporation of California Filed Dec. 22, 1958, Ser. No. 782,133

3 Claims. (Cl. 137—64)

The invention relates to breathing equipment and has particular reference to a combination type valve which, though normally held in open position, becomes operative under special circumstances as a check valve and a relief valve. More particularly the invention relates to a valve device having two connections, namely, one adapted to be attached to a permanent oxygen supply which is fixed within an airplane cockpit and another attached to a portable oxygen supply carried with the pilot, the first-mentioned connection being subject to release, should the pilot leave the airplane, in which event it closes against ingress of air and renders the device operative solely upon the portable oxygen supply.

Although breathing equipment has been heretofore provided with composite valve combinations capable of successful operation on a portable supply after being cut off from a main supply, certain disadvantages have been present which under the critical conditions experienced in high altitude flying have needed remedying.

The critical nature of demands upon equipment of the type made reference to requires that the devices be assembled, adjusted and serviced under well controlled conditions. Obviously the best circumstances wherein to service such equipment is at an established factory or service center. Those devices intended to be adjustable in the field present an opportunity for becoming maladjusted or imperfectly adjusted and are for that reason objectionable. Field conditions are often not conducive to the making of a proper and effective adjustment.

Moreover, where equipment is such that the entire device must be removed and sent to the shop for adjustment of a single portion, a very considerable amount of inconvenience results.

It is therefore among the objects of the invention to provide a new and improved composite tank relief valve assembly wherein the relief valve portion comprises a unitary structure which can be separated from the assembly and easily and quickly replaced by a new or reconditioned unit of the proper type.

Another object of the invention is to provide a new and improved tank relief valve assembly wherein the relief valve unit is so constructed that it operates with a substantially maximum degree of freedom, thereby to preclude any possible malfunctioning and to carry assurance that the assembly will operate under conditions prevalent when the main air supply is cut off without prospect of failure.

Still another object of the invention is to provide a new and improved tank relief valve unit for employment in a valve assembly wherein resilient means in the form of springs are employed in place of fixed guides, thereby to substantially minimize the prospect of any essential valve members failing to operate at critical times.

Still another object of the invention is to provide a new and improved unit structure for mounting a relief valve which is compact in its arrangement, which contains relatively few loose parts and which is of such design and construction that the unit can be quickly and accurately assembled in the first instance and also readily interchanged with such a unit present in the assembly by persons who need no special skill.

With these and other objects in view, the invention consists in the construction, arrangement and combination of the various parts of the device whereby the objects contemplated are attained, as hereinafter set forth, pointed out in the appended claims and illustrated in the accompanying drawings.

Figures 1, 2, 3, 4:
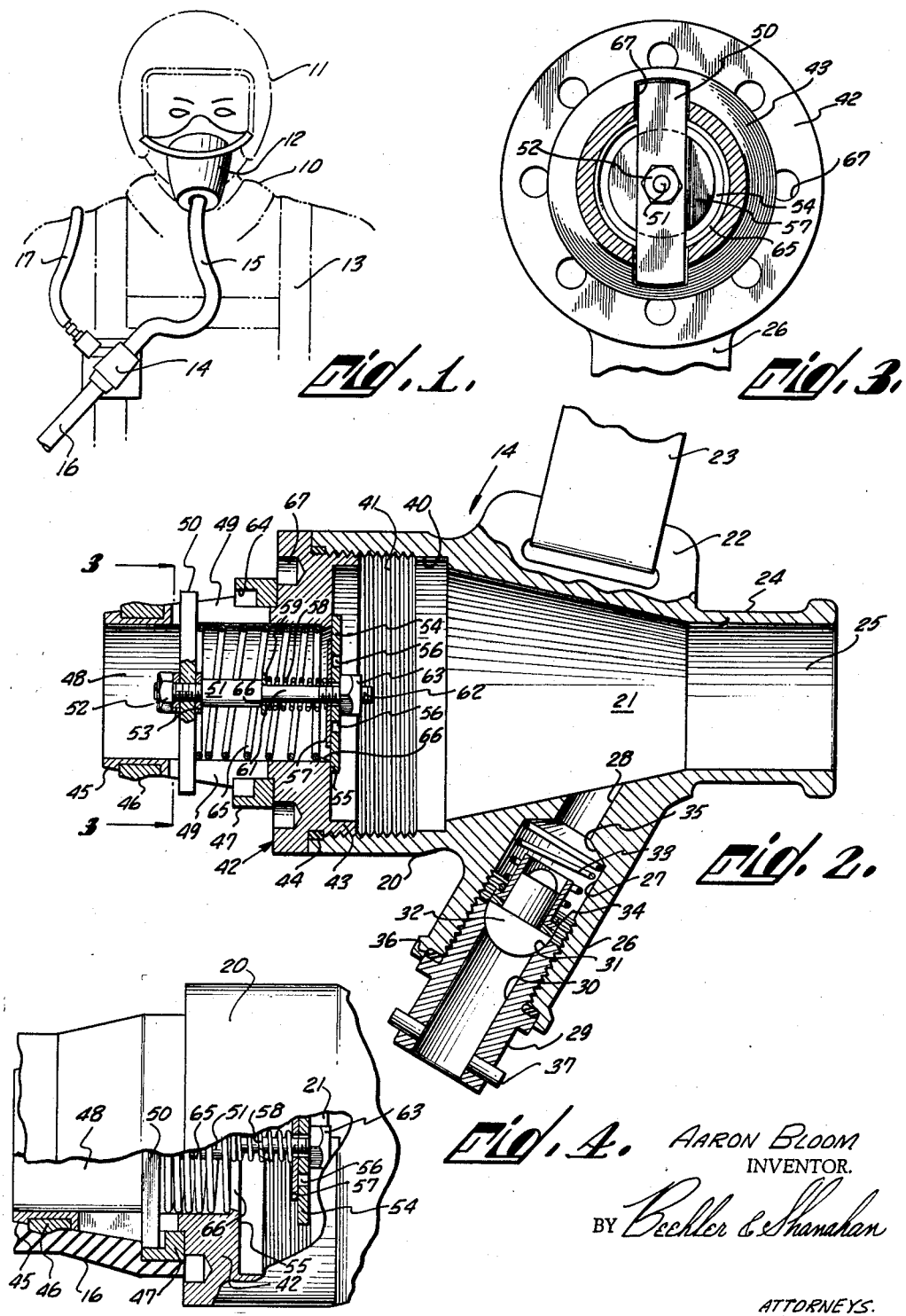
Figure 1 is a front elevational view illustrating a pilot equipped with a valve assembly at a location which would normally be employed in actual use.
Figure 2 is a longitudinal sectional view of the assembly showing the structure and location of a tank relief valve unit therein.
Figure 3 is a cross-sectional view taken on the line 3—3 of Figure 2.
Figure 4 is a side elevational view of the assembly partially broken away showing the relationship of the parts when the fixed tank is connected thereto.

In an embodiment of the invention chosen for the purpose of illustration there is shown a pilot 10 wearing a helmet 11 and a mask assembly indicated generally by the reference character 12. A harness 13 worn by the pilot has attached thereto a valve assembly 14 from which extends a mask supply line 15, a main supply line 16 and an auxiliary tank supply line 17.

The valve assembly comprises a valve body 20 having a chamber 21 therein. A bracket 22 provides an attachment for a harness strap 23. At one end of the body is a connection 24 adapted to have the mask supply line 15 attached, there being an opening 25 through the connection 24.

On one side of the body is an auxiliary tank connection 26 in which is a bore 27 communicating through a passage 28 with the chamber 21. In the connection 26 is a check valve comprising a fitting 29 having a passage 30 therethrough and a valve seat 31 in which a valve element 32 is seated. The valve element is urged to seating position by means of a spring 33 acting between a shoulder 34 at one end and a shoulder 35 at the bottom of the bore 27 for the other end. A seal 36 seals the junction between the fitting 29 and the connection 26 and a pin 37 provides physical means for attachment of the auxiliary tank supply line 17.

At one end of the chamber 21 is a cylindrical walled bore 40 having threads 41 for reception of a base structure indicated generally by the reference character 42. The base structure comprises a flange 43 having a threaded engagement with the threads 41, there being provided a seal ring 44 at the base of the threaded portion of the flange. An extension 45 on the base structure has a connection ring 46 on the exterior thereof adapted to improve the retention of the main supply line 16 when it is attached thereto. An expansion ring 47 functions with the ring 46 in retaining the main supply line 16 in attached position, as illustrated in Figure 4.

The base structure 42 previously made reference to in essence houses a valve sub-assembly and the base structure together with the valve sub-assembly functions as a unit structure for this portion of the complete valve assembly. Extending through the base structure 42 is an axial bore 48 which communicates between the bore 40 and chamber 21 jointly at one end and at the other end with either the interior of the main supply line 16 or the atmosphere when the supply line is disconnected.

At the sides of the extension 45 are openings 49 which communicate between the axial bore 48 and the outside surface of the extension 45. These openings are elongated so as to provide an ample travel distance for a guide 50 which extends into the opening.

The guide 50 is mounted upon a valve stem 51 by means of a nut 52 and washer 53. At the opposite end of the valve stem is a valve element 54 which seats around its outer edge upon an annular valve seat 55.

Extending through the valve element 54 are auxiliary passageways 56. These passageways are normally closed by action of an auxiliary valve element 57 which is urged against the valve element 54 and passageways 56 by a relatively light coiled spring 58. The spring bears directly against the auxiliary valve element 57 at one end and against a washer 59 at the other end which is supported upon a shoulder 60 of the valve stem 51. The shoulder is located between a reduced portion 61 and the main portion of the valve stem, there being provided a threaded end 62 and a nut 63 by means of which the valve parts are attached to the stem in a fashion permitting adjustment of tension of the spring 58.

In operation with the supply lines attached the valve element 54 is in unseated position, as shown in Figure 4. This is accomplished by action of the main supply line 16, the end of which pushes against the guide 50 when it is attached, moving the guide into recesses 64 in the ring 47. In this position a main spring 65 is compressed by virtue of the fact that the inner end of the spring is retained upon an annular shoulder 66 at the inner end of the axial bore 48 immediately adjacent the valve seat 55. The guide 50 presses against the outer end of the spring 65.

When, for any reason such as ejection of the pilot, the main supply line 16 is disconnected from the extension 45, the spring 65 in expanding moves the guide 50 outwardly within the openings 49 which in turn by action of the stem 51 presses the valve element 54 against the seat 55.

It will be noted that there is no sliding guide for the valve stem 51 nor of any portions of the valve elements. Further still, the openings 49 are made substantially wider than the guide 50 so that there is an extremely loose connection without any prospect of frictional drag between the guide and the walls of the openings 49. Further, by reason of the fact that the spring 65 is of large diameter, as large as can be freely accommodated within the axial bore 48, the spring at its outer end bears against portions of the guide 50 at locations substantially remote from the center where the guide is connected to the valve stem 51. By making the end loops of the spring substantially parallel to each other, the spring expands straight in an axial direction and the resiliency inherent in the spring acting through the guide 50 holds the stem in a substantially true axial position centrally disposed within the axial bore 48.

Hence, the valve element 54 seats firmly upon the seat 55 and, by virtue of the relatively great tension in the spring 65, prevents unseating of the valve due to any pressure differential between the surrounding atmosphere and the chamber 21.

Under these circumstances where the main supply line is removed, the valve assembly and mask proceed to draw upon an auxiliary tank, not shown, which communicates through the supply line 17 to the connection 26 and the chamber 21. Gas or air from the auxiliary supply line 17 when pressure is present unseats the check valve element 32 so that it can pass through the opening 25 to the mask supply line 15 when the pilot inhales.

When the pilot exhales, the check valve 32 is seated and pressure exerted by the act of exhaling unseats the auxiliary valve element 57 when the respiratory gases being exhausted pass through the auxiliary passageways 56 in the valve element 54. By having the spring 58 one of very light tension, no unnecessary impediment is offered to the unseating of the auxiliary valve element and hence the respiratory gases can be freely exhaled, passing as explained first through the auxiliary passageways 56 and thence through the axial bore 58 to the atmosphere either outwardly of the end of the axial bore or laterally in addition through the openings 49.

As promptly as the exhaling cycle ceases and the pilot inhales, the light spring 58 will close the auxiliary valve element 57 against the auxiliary passageways 56 and the auxiliary tank supply line 17 will then again be called upon to supply air or gas to the mask 12 as the pilot breathes.

From the explanation given it will be evident that the valve element 54 and auxiliary valve element 57 are assembled and mounted as a unit in and carried by the base structure 42. These valves and the accompanying springs, stem and guide can all be carefully mounted and adjusted in the base structure without reference to the valve body 20 or other parts which ultimately form the assembly. The base structure can be easily mounted in place by screwing into the bore 40 with the aid of spanner wrench holes 67. When in position the moving valve parts move with freedom equal to the freedom of movement when the base assembly is on the shop bench during adjustment. Hence, the adjustment can be perfected in accordance with shop practice and the valve structure as a unit inserted into the body as needed. Should the valve structure require replacement or servicing, it can be readily removed and a spare valve unit inserted in its place while the original is being serviced. Valve units are thus completely interchangeable and readily replaced in the field without the necessity for any adjustment of the working parts.

It will further be apparent that moving parts have been reduced to a minimum and that there are no loose parts other than the composite part consisting of the two valves, the stem, and the guide which are interconnected as a subassembly and, although loosely fitting, are nevertheless securely contained in the base structure at all times.

Valving components being contained in a single body can be used in a variety of housing arrangements. This can be done without readjustment of the parts, permitting it to be used, for example, in a T block arrangement, a four-way arrangement, or any manifold configuration desired. Unit construction of the type disclosed also simplifies design problems for interchangeability.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. An auxiliary tank relief valve for breathing apparatus comprising a body having a chamber therein, a main supply connection thereto comprising a base forming one end of said body and having a connection therewith, a bore through said base communicating between the chamber and the exterior, opening means in the base communicating between the bore and the exterior, a valve seat at the inside end of said bore and a valve assembly in said bore comprising a valve element seating on said seat, a valve stem on said element extending outwardly and a retainer on the outer end of the stem loosely slidable in said opening means between closed and open positions of said valve element, a shoulder on said base, and a spring of relatively greater strength between the shoulder and said retainer and acting in a direction urging said valve element to seated position, means forming an auxiliary passageway through said valve element, an auxiliary valve element on the outside of said first valve element in a position normally closing said auxiliary passageway, and a spring of relatively lesser strength acting between the auxiliary valve element and the valve assembly whereby normally to hold said auxiliary valve element in closed position and to enable exhaustion of air from the chamber when said first identified valve element is in a seated position.

2. An auxiliary tank relief valve for breathing apparatus comprising a body having a chamber therein, a main supply connection comprising a base forming one end of said body and having a screw connection therewith, a bore through said base communicating between the chamber and the exterior, means forming openings at the sides of said base communicating between the bore and the exterior, a valve seat at the inside end of said bore, and a valve assembly in said bore comprising a valve element overlying said seat in a position closing said bore, a valve stem on said element extending outwardly and a retainer on the outer end of the stem loosely slidable in said openings between closed and open positions of said valve element, a shoulder at the circumference of said bore, and a spring of relatively greater strength between the shoulder and said guide and acting in a direction urging said valve element to seated position, means forming an auxiliary passageway through said valve element, an auxiliary valve element on the outside face of said first valve element in a position overlying said auxiliary passageway, and a spring of relatively lesser strength acting between the auxiliary valve element and the valve assembly whereby to enable exhaustion of air from the chamber when said first identified valve element is in a seated position.

3. An auxiliary tank relief valve for breathing apparatus comprising a body having a chamber therein, an auxiliary tank inflow connection on said body in communication with said chamber having a check valve therein, a mask hose outflow connection on the body in communication with said chamber and a main supply inflow connection, said main supply inflow connection comprising a base forming one end of said body and the chamber and having a screw connection therewith, an axial bore through said base communicating between the chamber and the exterior, means forming openings at the sides of said base communicating between the bore and the exterior, and a valve assembly in said bore comprising a valve element overlying an inside end of said base in a position closing said bore, a valve stem on said element extending outwardly and a retainer on the outer end of the stem loosely slidable in said openings between closed and open positions of said valve element, a shoulder extending around the circumference of said bore at the inside end, and a spring of relatively greater strength having turns thereof lying adjacent the wall of said axial bore and under compression between the shoulder and said guide whereby to urge said valve element to seated position, means forming an auxiliary passageway through said valve element, an auxiliary valve element on the outside face of said first valve element in a position overlying said auxiliary passageway, and a spring of relatively lesser strength and small diameter acting under compression between the auxiliary valve element and the valve stem whereby normally to hold said auxiliary valve element in closed position and to permit opening of said auxiliary valve element for exhaustion of air from the chamber when said first identified valve element is in a seated position.

References Cited in the file of this patent
UNITED STATES PATENTS

| | | |
|---|---|---|
| 2,824,557 | Mejean et al. | Feb. 25, 1958 |
| 2,839,054 | Kindred | June 17, 1958 |